United States Patent
Xu et al.

(10) Patent No.: US 10,460,300 B2
(45) Date of Patent: Oct. 29, 2019

(54) METHOD OF PREVENTING FRAUD AND THEFT DURING AUTOMATED TELLER MACHINE TRANSACTIONS AND RELATED SYSTEM

(71) Applicant: MULTIMEDIA IMAGE SOLUTION LIMITED, Dublin (IE)

(72) Inventors: LianBo Xu, Dublin (IE); Hui Deng, Dublin (IE); Jin Wang, Dublin (IE)

(73) Assignee: MULTIMEDIA IMAGE SOLUTION LIMITED, Dublin (IE)

( * ) Notice: Subject to any disclaimer, the term of this patent is extended or adjusted under 35 U.S.C. 154(b) by 702 days.

(21) Appl. No.: 15/169,765

(22) Filed: Jun. 1, 2016

(65) Prior Publication Data

US 2017/0352015 A1    Dec. 7, 2017

(51) Int. Cl.

| | |
|---|---|
| *G06Q 20/10* | (2012.01) |
| *G06Q 20/40* | (2012.01) |
| *G07F 19/00* | (2006.01) |
| *H04N 7/18* | (2006.01) |
| *G06K 9/00* | (2006.01) |
| *G06K 9/34* | (2006.01) |

(52) U.S. Cl.
CPC ..... *G06Q 20/1085* (2013.01); *G06K 9/00281* (2013.01); *G06K 9/00389* (2013.01); *G06K 9/346* (2013.01); *G06Q 20/40145* (2013.01); *G07F 19/207* (2013.01); *H04N 7/188* (2013.01)

(58) Field of Classification Search
CPC .......... G06Q 20/1085; G06Q 20/40145; G07F 19/207; H04N 7/188; G06K 9/00281; G06K 9/00389; G06K 9/346
See application file for complete search history.

(56) References Cited

U.S. PATENT DOCUMENTS 6,045,039 A * 4/2000 Stinson .................. G06Q 20/18
                                                            235/379
6,149,056 A * 11/2000 Stinson .............. G06Q 20/1085
                                                            235/379

(Continued)

FOREIGN PATENT DOCUMENTS

JP          09106470 A  *  4/1997
JP        2006039841 A  *  2/2006

(Continued)

*Primary Examiner* — Daniel I Walsh
(74) *Attorney, Agent, or Firm* — Winston Hsu (57) ABSTRACT

A method of preventing fraud and theft during automated teller machine (ATM) transactions includes recording a video stream using a camera mounted on or near the ATM, the camera being positioned to record the face of a user of the ATM and a background behind the user, providing a facial model database containing images of a large number of people taken from different angles, the facial model database containing images of unobscured faces as well as obscured faces, and receiving insertion of a bank card into the ATM. The method further includes comparing images captured from the recorded video stream with images contained in the facial model database, and producing a corresponding first face comparison result, and issuing a notice for the user to uncover the user's face when the first face comparison result indicates that the user's face is obscured.

17 Claims, 10 Drawing Sheets

(56) References Cited

U.S. PATENT DOCUMENTS

| | | | | |
|---|---|---|---|---|
| 6,181,805 | B1* | 1/2001 | Koike | G06K 9/00288 |
| | | | | 382/118 |
| 6,731,778 | B1* | 5/2004 | Oda | G06Q 20/1085 |
| | | | | 348/156 |
| 7,409,091 | B2* | 8/2008 | Sung | G06K 9/00248 |
| | | | | 382/159 |
| 7,783,083 | B2* | 8/2010 | Sung | G06K 9/00281 |
| | | | | 358/448 |
| 9,230,440 | B1* | 1/2016 | Penilla | G08G 1/145 |
| 9,558,523 | B1* | 1/2017 | Hodge | G06Q 50/26 |
| 9,607,210 | B2* | 3/2017 | Yesugade | G06K 9/00281 |
| 10,181,073 | B2* | 1/2019 | Chattopadhyay | G06K 9/00281 |
| 10,303,963 | B1* | 5/2019 | Edwards | G06K 9/00892 |
| 2004/0263621 | A1* | 12/2004 | Guo | G08B 13/19663 |
| | | | | 348/143 |
| 2005/0094849 | A1* | 5/2005 | Sung | G06K 9/00248 |
| | | | | 382/103 |
| 2005/0143133 | A1* | 6/2005 | Bridgelall | H01Q 1/007 |
| | | | | 455/562.1 |
| 2006/0054684 | A1* | 3/2006 | Li | G07F 19/20 |
| | | | | 235/379 |
| 2006/0291001 | A1* | 12/2006 | Sung | G06K 9/00281 |
| | | | | 358/453 |
| 2006/0291694 | A1* | 12/2006 | Venetianer | G06K 9/00369 |
| | | | | 382/103 |
| 2007/0013493 | A1* | 1/2007 | Liaw | G07F 19/207 |
| | | | | 340/426.1 |
| 2008/0063236 | A1* | 3/2008 | Ikenoue | G06K 9/32 |
| | | | | 382/103 |
| 2008/0074496 | A1* | 3/2008 | Venetianer | G06K 9/00335 |
| | | | | 348/150 |
| 2008/0251578 | A1* | 10/2008 | Jansing | G07F 7/1075 |
| | | | | 235/379 |
| 2008/0278579 | A1* | 11/2008 | Donovan | H04N 7/18 |
| | | | | 348/143 |
| 2009/0140838 | A1* | 6/2009 | Newman | G06Q 20/40 |
| | | | | 340/5.83 |
| 2009/0169067 | A1* | 7/2009 | Chang | G06K 9/00295 |
| | | | | 382/118 |
| 2009/0201372 | A1* | 8/2009 | O'Doherty | G07F 19/20 |
| | | | | 348/150 |
| 2010/0026808 | A1* | 2/2010 | Kagehiro | G07F 19/20 |
| | | | | 348/152 |
| 2013/0051677 | A1* | 2/2013 | Lee | G06K 9/00771 |
| | | | | 382/192 |
| 2013/0155229 | A1* | 6/2013 | Thornton | H04N 7/18 |
| | | | | 348/143 |
| 2014/0063191 | A1* | 3/2014 | Bataller | G07C 9/00158 |
| | | | | 348/46 |
| 2014/0067679 | A1* | 3/2014 | O'Reilly | G06F 21/32 |
| | | | | 705/44 |
| 2015/0066764 | A1* | 3/2015 | Crowell | G06K 9/00308 |
| | | | | 705/44 |
| 2015/0213427 | A1* | 7/2015 | Hodges | G07F 19/2055 |
| | | | | 705/18 |
| 2016/0275518 | A1* | 9/2016 | Bowles | G06K 9/00087 |
| 2017/0255942 | A1* | 9/2017 | Chandrasekaran | G06Q 20/202 |
| 2017/0352015 | A1* | 12/2017 | Xu | G06Q 20/1085 |
| 2017/0357847 | A1* | 12/2017 | Jabri | G06K 9/4628 |
| 2017/0372144 | A1* | 12/2017 | Kurita | G08B 13/196 |
| 2018/0063149 | A1* | 3/2018 | Nagaratnam | H04L 63/102 |
| 2018/0089499 | A1* | 3/2018 | Sun | G06K 9/00288 |

FOREIGN PATENT DOCUMENTS

| | | | | |
|---|---|---|---|---|
| JP | 2006079382 A | * | 3/2006 | ......... G06Q 20/4014 |
| JP | 2006331049 A | * | 12/2006 | |
| JP | 2007323517 A | * | 12/2007 | |
| JP | 2008015686 A | * | 1/2008 | |
| JP | 2010072989 A | * | 4/2010 | |

* cited by examiner

METHOD OF PREVENTING FRAUD AND THEFT DURING AUTOMATED TELLER MACHINE TRANSACTIONS AND RELATED SYSTEM

BACKGROUND OF THE INVENTION

1. Field of the Invention

The invention relates to image and video processing, and more particularly, to a method of analyzing a video stream in order to prevent fraud and theft during automated teller machine transactions.

2. Description of the Prior Art

In recent times, the automated teller machine (ATM) has become increasingly popular. Banks make extensive use of ATMs due to the low cost compared to a traditional bank teller, and due the 24-hour availability of ATMs. ATMs can be placed in a wide variety of locations, providing users with great convenience when needing to withdraw cash or perform other banking functions. When a user wishes to access his bank account through an ATM, the user inserts a bank card having a magnetic strip and/or an integrated circuit chip into the ATM, and the user then enters his personal identification number (PIN) to access his bank account.

Although ATMs now handle many bank transactions that were traditionally handled by human bank tellers, ATMs are not without their drawbacks. Safety is a priority when withdrawing money. However, none of the ATMs on the market today employ an intelligent safety monitoring system. This causes users to worry about their safety when using ATMs. Furthermore, criminals can take advantage of people withdrawing money from ATMs, which is harmful to society as a whole. Therefore, there is a strong need for away to prevent fraud and theft when using ATMs.

SUMMARY OF THE INVENTION

It is therefore one of the primary objectives of the claimed invention to provide a method and related system for preventing fraud and theft during automated teller machine transactions.

According to an exemplary embodiment of the claimed invention, a method of preventing fraud and theft during automated teller machine (ATM) transactions is disclosed. The method includes recording a video stream using a camera mounted on or near the ATM, the camera being positioned to record the face of a user of the ATM and a background behind the user, providing a facial model database containing images of a large number of people taken from different angles, the facial model database containing images of unobscured faces as well as obscured faces, and receiving insertion of a bank card into the ATM. The method further includes comparing images captured from the recorded video stream with images contained in the facial model database, and producing a corresponding first face comparison result, and issuing a notice for the user to uncover the user's face when the first face comparison result indicates that the user's face is obscured.

According to another exemplary embodiment of the claimed invention, a system of preventing fraud and theft during automated teller machine (ATM) transactions is disclosed. The system includes an ATM, the ATM comprising a first processor for controlling operation of the ATM, a card slot for receiving insertion of a bank card into the card slot, and a user interface. The system further includes a camera mounted on or near the ATM, the camera recording a video stream and being positioned to record the face of a user of the ATM and a background behind the user. A facial model database contains images of a large number of people taken from different angles, the facial model database containing images of unobscured faces as well as obscured faces. The system also includes a monitoring device comprising a second processor, the monitoring device comparing images captured from the recorded video stream with images contained in the facial model database, and producing a corresponding first face comparison result. The user interface of the ATM issues a notice for the user to uncover the user's face when the first face comparison result indicates that the user's face is obscured.

It is an advantage that the present invention is able to monitor the ATM camera's video stream in order to automatically detect situations in which the user's face is obscured, when a person in the background behind the user has his face obscured, when the user is acting suspiciously, or when a person in the background is acting suspiciously. In this way, fraudulent use of the ATM and robbery of users of the ATM can be minimized. Not only can the present invention prevent crime, but it can also make users more willing to use the ATM by giving the users peace of mind regarding their safety while using the ATM.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
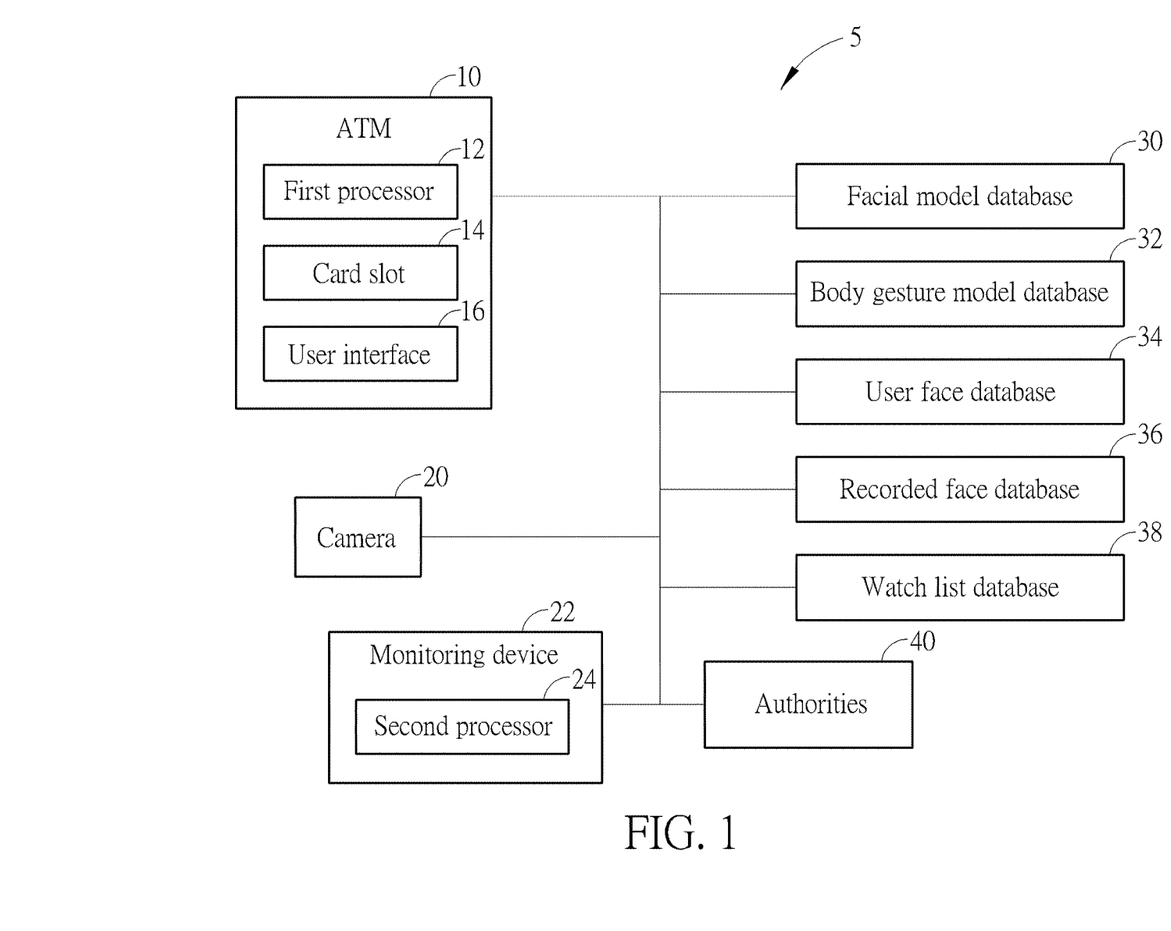
FIG. 1 is a functional block diagram of a system for preventing fraud and theft during automated teller machine (ATM) transactions.

Please refer to FIG. 1. FIG. 1 is a functional block diagram of a system 5 for preventing fraud and theft during automated teller machine (ATM) transactions. The system 5 comprises an ATM 10, a camera 20, and a monitoring device 22. The ATM 10 comprises a first processor 12 for controlling operation of the ATM 10, a card slot 14 for receiving a bank card that is inserted into the card slot 14, and a user interface 16 for interacting with a user of the ATM 10. The user of the ATM 10 is defined as the person who is operating or attempting to operate the ATM 10. The camera 20 is mounted either on or near the ATM 10, and the camera 20 records a video stream of both a user and the background of the user that is using the ATM 10. The camera 20 should be positioned to record the face of the user in addition to the background behind the user. The monitoring device 22 comprises a second processor 24 for controlling operating of the monitoring device 22, and the monitoring device 22 monitors the video stream produced by the camera 20 to detect whether any suspicious activity occurs. Suspicious activity can be detected when the user of the ATM 10 has his face obscured, when an unidentified person in the background behind the user has his face obscured, when the user is making gestures that are consistent with suspicious activity, or when a person in the background is making gestures that are consistent with suspicious activity.

The monitoring device 22 compares images from the video stream with data from a large number of databases, and if suspicious activity is detected, the monitoring device 22 can alert the user of the ATM 10 and/or can alert authorities 40. These authorities 40 include the bank that owns the ATM 10, the police, or a security company hired by the owner of the ATM 10. The various databases accessed by the monitoring device 22 will be described below.

Figure 2:
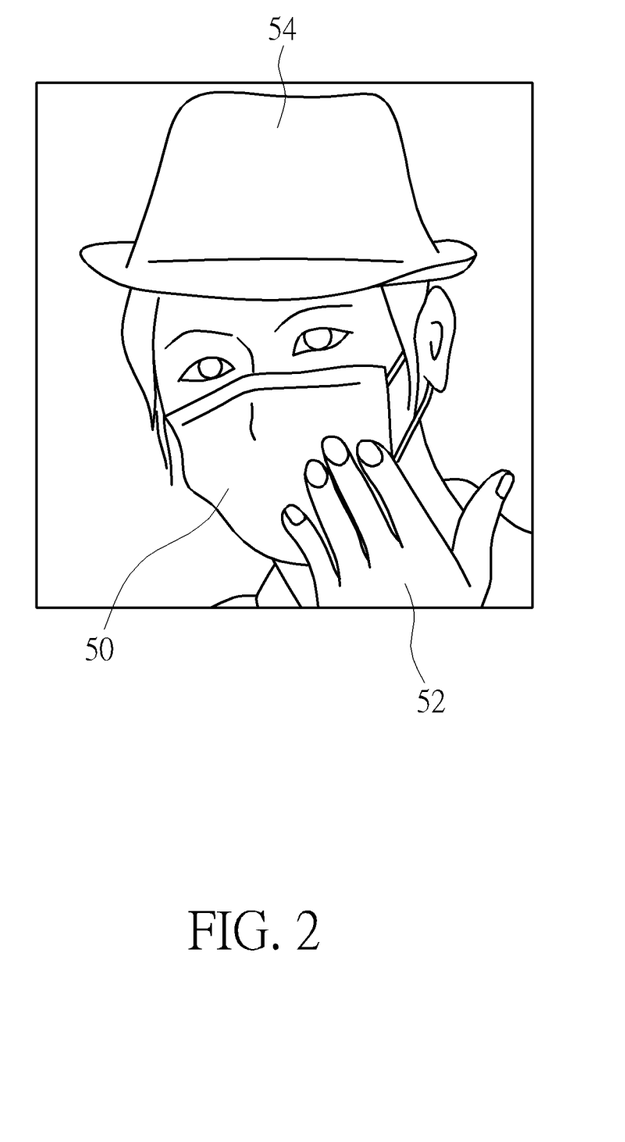
FIGS. 2-7 show various articles or objects that obscure faces, which are detected by the monitoring device of the present invention.
Figure 3:
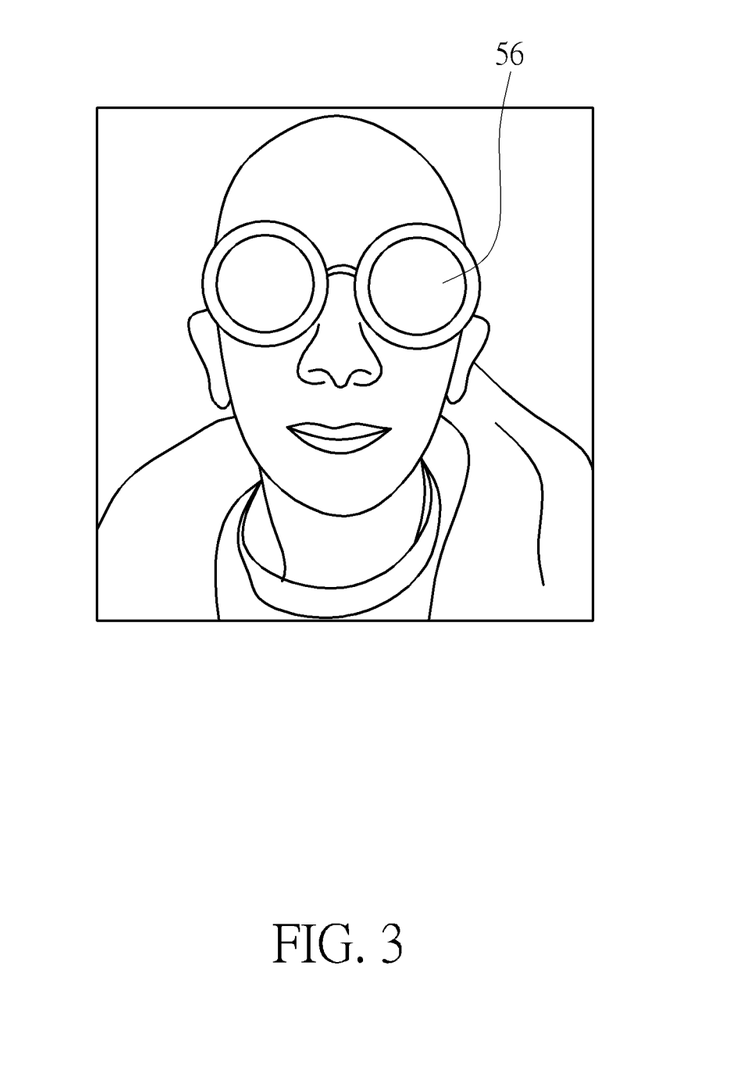
Figure 4:
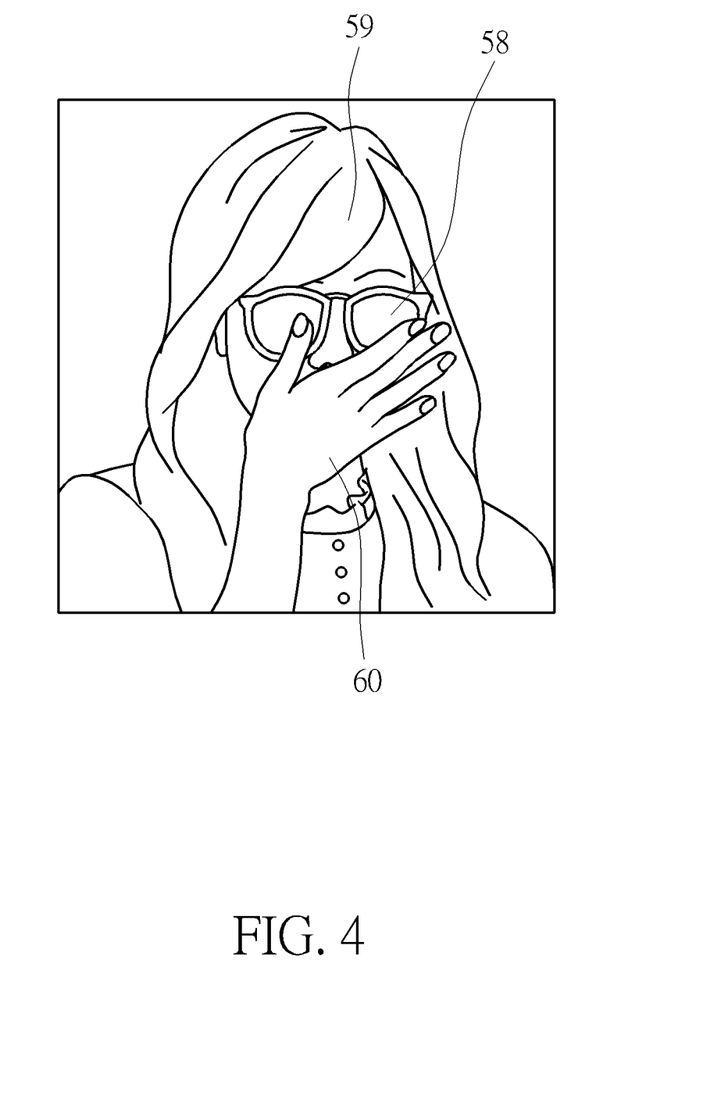
Figure 5:
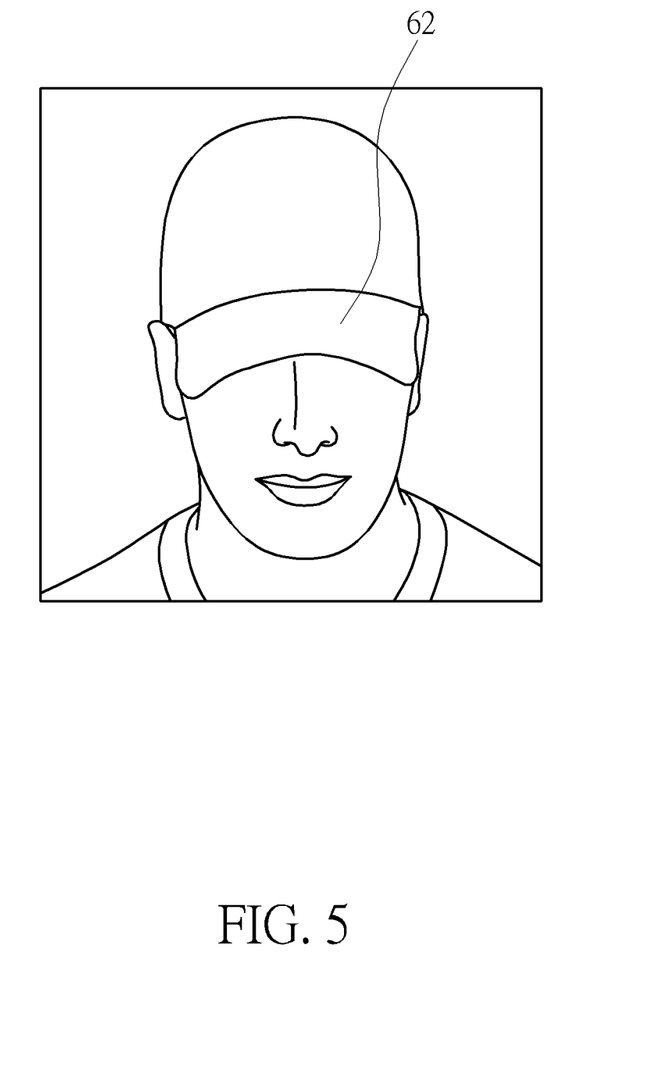
Figure 6:
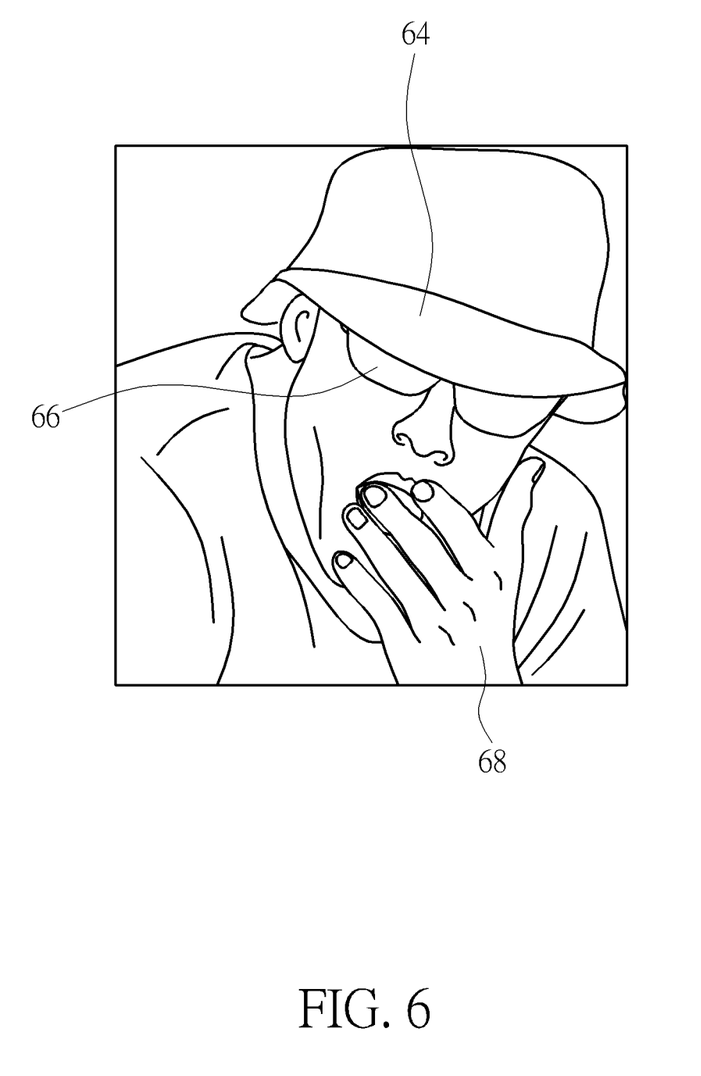
Figure 7:
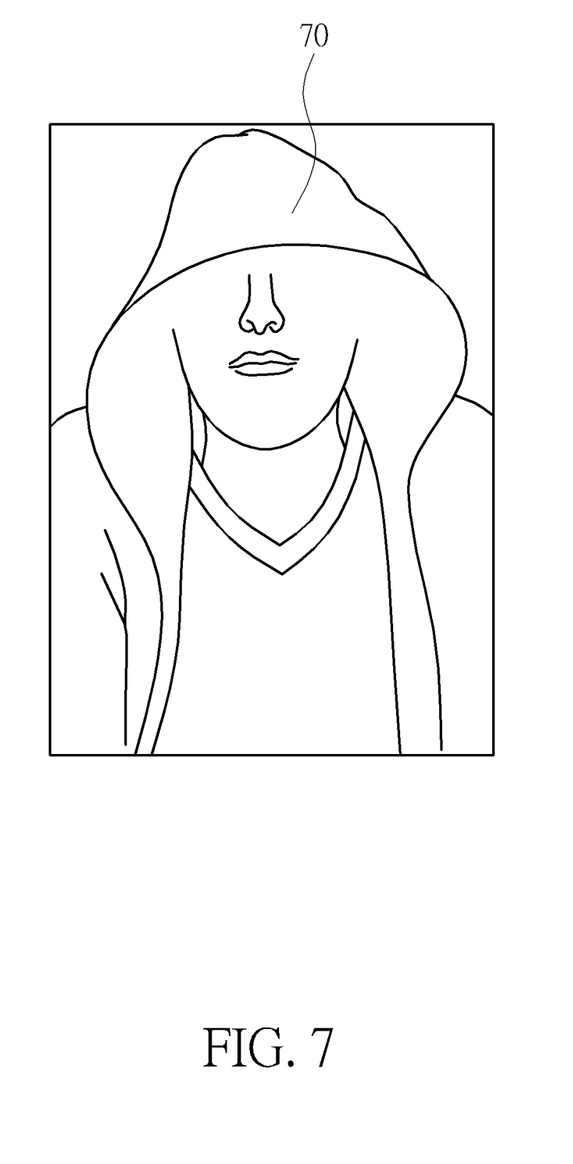

One primary goal of the present invention is to detect when the user's face is obscured, or blocked, by anything that makes it difficult to see the user's face. In the following disclosure, the terms "blocked" and "obscured" will be used interchangeably, and the terms "not blocked" and "unobscured" will also be used interchangeably. Common items that may block a user's face are shown in FIG. 2 to FIG. 7. FIGS. 2-7 show various articles or objects that obscure faces, which are detected by the monitoring device 22 of the present invention. Any object that may cover all or part of a face, which makes it harder to identify a person, is something the monitoring device 22 can detect. FIG. 2 shows a person whose face is covered by a facial mask 50, a hand 52, and a hat 54. FIG. 3 shows a person whose face is covered by sunglasses 56. FIG. 4 shows a person whose face is covered by sunglasses 58, hair 59, and a hand 60. FIG. 5 shows a person whose face is covered by a cap 62, such as a baseball cap. FIG. 6 shows a person whose face is covered by a hat 64, sunglasses 66, and a hand 68. FIG. 7 shows a person whose face is covered by a hood 70. All of these objects serve to block the user's face, thereby making it harder to identify the user. The user may be blocking his face intentionally or unintentionally, but the end result is the camera 20 cannot be used to easily identify the user when the user's face is blocked.

The monitoring device 22 accesses a facial model database 30 for determining if the user's face is obscured or unobscured. The facial model database 30 is built using facial images of many different users in order to train and create the facial model database 30. A wide variety of different facial images are used, including faces that are obscured or blocked in different ways, and those that are not obscured or blocked. The facial model database 30 is built using images of users having different skin colors, users facing different angles, user images with different brightness levels, and so on. The wider the variety of images used to create the facial model database 30, the more accurate the results will be in actual use. Particular focus can be paid to images of users who are normally withdrawing money and the characteristics of these images. Whether the user's forehead, eyes, nose, mouth, or even hair is being blocked, the facial model contained in the facial model database 30 is able to identify this situation. When the monitoring device 22 determines that the user's face is blocked, the monitoring device 22 can trigger a reminder that is output through the user interface 16 of the ATM 10 to inform the user that he should remove the article or object that is blocking the user's face so that the user's face can be clearly seen. The facial model database 30 can be trained with real image samples taken from the video stream of the camera 20 or other similar cameras, and the facial model database 30 can also be supplemented with custom-made samples for the purpose of training.

When a user is using the ATM 10, the monitoring device 22 will analyze images taken from the video stream produced by the camera 20, and the monitoring device 22 will detect whether the user's face is obscured or not by comparing the images of the user with images contained in the facial model database 30. The user's face may be obscured in a wide number of ways, including wearing a hat, helmet, headscarf, hood, sunglasses, decorative glasses, eye patch, eye mask, mouth mask, and so on. The user's face may also be obscured by using one or more hands to cover the face, or by covering the face with a scarf.

Under normal facial conditions, if lighting is not considered, a calculation can be used to set the position of the user's face. If there is too much light, too little light, a backlight, or other complex conditions, then it becomes more difficult to set the position of the user's face. Furthermore, an obscured face loses many facial features that would otherwise be visible if the obstruction was removed. As noted above, various lighting conditions, various angles, and various users having faces that are both obscured and unobscured can be used to train the facial model contained in the facial model database 30. By consulting the facial model database 30, the monitoring device 22 can then determine which part of a user's face is being blocked.

When a user is withdrawing money or performing other financial transactions through the ATM 10, the monitoring device 22 will detect whether the user's face is obscured. If the monitoring device 22 determines that the user's face is indeed obscured, the user can be given a reminder to uncover his face. If the user still insists on continuing to use the ATM 10 while his face is obscured, the monitoring device 22 can choose to consider this user to be exhibiting suspicious behavior. Steps can then be taken to protect the security of the account corresponding to the bank card that the user has inserted into the card slot 14 of the ATM 10. For example, the ATM 10 can terminate the user's transaction and not allow the user to complete the withdrawal or transfer of funds that the user was attempting. In addition to, or instead of terminating the user's transaction, the monitoring device 22 can also inform the authorities 40 about the situation. The authorities 40 can choose whether or not to begin tracking this user if the authorities 40 deem the user to be a suspicious person.

With the ease of obtaining information through the internet, there are many criminals that use other people's identity to obtain bank cards for themselves, and the criminals can then go to the ATM 10 to withdraw money. Often this type of criminal will wear a cap with a long bill covering the criminals face, or will take other steps to block his face, so as to prevent the camera 20 from clearly seeing his face. The monitoring device 22 can judge whether a user of the ATM 10 is making a normal withdrawal based on whether the user's face is blocked or not. If a user uses the ATM 10 to withdraw money while his face is blocked, the monitoring device 22 can instruct the ATM 10 to stop the user from withdrawing money. A record can also be made, complete with photos or videos of the user, and the time, date, and location of the withdrawal attempt. Even if the user's face is not blocked when the user withdraws money from the bank account associated with the bank card, a similar record can also be made so that complete records are produced. This kind of record can be stored in a recorded face database 36, which stores the images of the user and any unidentified people in the background, along with the time, date, and location where the images were taken. This record stored in the recorded face database 36 can then be used to help accuse the user of a crime if it later turns out that a crime was committed.

In another embodiment, a user face database 34 can be built, where the user face database 34 contains facial images previously recorded and associated with the account corresponding to the bank card inserted into the ATM 10. When the user withdraws money from the ATM 10, the monitoring device 22 can compare recorded images of the user's face that are obtained from the video stream with other facial images stored in the user face database 34, where these other facial images are associated with the account corresponding to the bank card inserted into the ATM 10. The monitoring device 22 can alert the authorities 40 when the recorded images of the user's face do not match the other facial images stored in the user face database 34 associated with the account corresponding to the bank card inserted into the ATM 10.

In another embodiment, a watch list database 38 can be built, where the watch list database 38 contains names and associated facial images of people included on a watch list. When the user withdraws money from the ATM 10, the monitoring device 22 can compare recorded images of the user's face that are obtained from the video stream with other facial images stored in the watch list database 38. The monitoring device 22 can alert the authorities 40 when the recorded images of the user's face match facial images of one or more people included in the watch list database 38. The watch list database 38 may contain information about people that are known criminals, such as government officials or corporate officials who have been caught embezzling money or being bribed. Since these known criminals may have had their own bank accounts frozen, they can only use the ATM 10 to get cash from other people's accounts. The monitoring device 22 can compare the faces of users with the faces stored in the watch list database 38. If the faces match, then the accessed bank account can be closely monitored.

Besides monitoring the user of the ATM 10, the facial model database 30 can also be used to help monitor people in the background behind the user. Robberies at ATMs often occur at night, when a user is withdrawing money while he is alone. To help with this situation, the monitoring device 22 can monitor the background, especially at night, when somebody is withdrawing money to detect if there are any suspicious people lurking in the background. Often these suspicious people will block their own faces in order to avoid having their identity exposed. When the monitoring device 22 detects that someone in the background has his face obscured, the monitoring device 22 can trigger the user interface 16 to issue a warning to the user of the ATM 10 to be aware of the person in the background. The monitoring device 22 can also alert the authorities 40 in this situation as well.

The monitoring device 22 performs facial detection in conjunction with the facial model database 30 to ensure that the person withdrawing money does not block his own face. In this way, the number of people purposefully blocking their own faces can be reduced, which can lessen the amount of money being stolen. Even if money is stolen, the facial records can be stored in the recorded face database 36 so that the perpetrator can be found more effectively. Faces stored in the recorded face database 36 can also be used to help train the facial model database 30 by providing even more images in the facial model database 30 after the images have been categorized according to whether the faces in the images are blocked or not.

Besides analyzing the faces of users and other people in the background, body gestures can be analyzed in order to look for suspicious behavior in both the user of the ATM 10 and the people in the background. A body gesture model database 32 can be built and trained using a body gesture model of many different behaviors. The body gesture model database 32 is trained with sequences of images of a large number of different body gestures, with some of the body gestures in the body gesture model database 32 indicating normal behavior and other body gestures in the body gesture model database 32 indicating suspicious behavior. An example of suspicious behavior includes a person in the background peeking at the user that is withdrawing money from the ATM 10. Another example is a user being forced to withdraw money by another person. The user himself may also exhibit suspicious behavior if the user appears to be extremely nervous. If the monitoring device 22 detects suspicious behavior while the user is withdrawing money, the monitoring device 22 can trigger the user interface 16 to issue a reminder to people in line to keep a safe distance from the user of the ATM 10, to alert the user about the situation, or to alert the authorities 40. If immediate danger is detected, the monitoring device 22 can alert the authorities 40 that the user is experiencing danger. Moreover, whenever suspicious behavior is detected by the monitoring device 22 in conjunction with the body gesture model database 32, the faces of all people involved can be recorded and stored in the recorded face database 36. This recorded facial data can help the authorities 40 solve cases more quickly.

The facial model database 30 can be applied to ATM rooms that are enclosed areas containing one or more ATMs. The fact that ATM rooms are enclosed can actually at times make users of the ATMs more vulnerable since they are somewhat isolated from the outside when a robber enters the ATM room after the user. If somebody in the background enters the ATM room and is acting suspiciously, the monitoring device 22 can detect this suspicious behavior with the help of the body gesture model database 32 while the user is withdrawing money. Also, if a user is being forced to withdraw money by another person, the monitoring device 22 can detect this as well in conjunction with the body gesture model database 32.

The monitoring device 22 can also analyze the recorded video stream to monitor the ATM 10 and a surrounding area of the ATM 10. When the monitoring device 22 detects that the ATM 10 or the surrounding area has been damaged, the monitoring device 22 can alert the authorities 40 so that the damage can be dealt with quickly. Criminals may use damaged facilities to commit crimes more easily, so fixing the damage quickly helps to ensure customers will be able to withdraw money from the ATM 10 more safely and securely.

Figure 8:
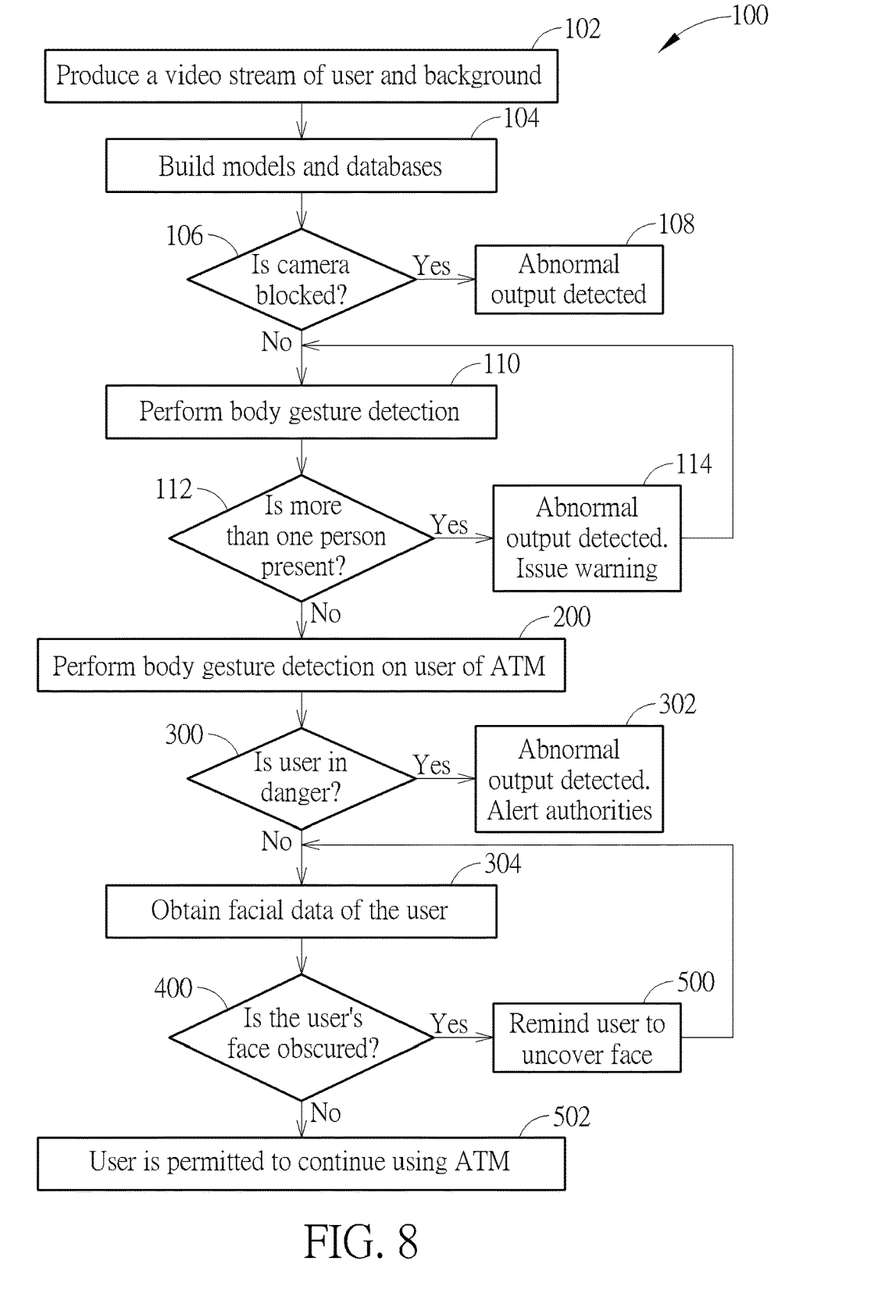
FIG. 8 is a flowchart describing the method of preventing fraud and theft during ATM transactions according to the present invention.

Please refer to FIG. 8. FIG. 8 is a flowchart 100 describing the method of preventing fraud and theft during ATM transactions according to the present invention. Steps in the flowchart 100 will be explained as follows.

Step 102: The camera 20 produces a video stream to record both a user and the background of the user that is using the ATM 10.

Step 104: Build models and databases. The facial model database 30 and the body gesture model database 32 are built, and can be built using bioinformatics software. One such possible software package is Visual Integrated Bioinformatics Environment (VIBE), made by INCOGEN. Optionally, during this step the user face database 34, the recorded face database 36, and the watch list database 38 are also built.

Step 106: Determine if the camera 20 is blocked. The monitoring device 22 analyzes the video stream received from the camera to determine if the camera 20 is being blocked. If the camera 20 is being blocked, go to step 108. Otherwise, go to step 110.

Step 108: Abnormal output is detected since the camera 20 is being blocked, and the process ends. The user is effectively prevented from withdrawing money from the ATM 10.

Step 110: Body gesture detection is performed. The monitoring device 22 analyzes the video stream and compares image sequences from the video stream with images stored in the body gesture model database 32 to produce a gesture comparison result.

Step 112: Determine if there is more than one person present in the video stream. According to the gesture comparison result produced in step 110, the monitoring device 22 determines if there is another person in the video stream besides the user that is using the ATM 10. If there is more than one person present, go to step 114. If not, go to step 200.

Step 114: Abnormal output is detected since there are multiple people in the video stream. The monitoring device 22 triggers the user interface 16 to issue a reminder to the people in the background behind the user withdrawing money to leave the premises or to ask them to keep a safe distance from the user of the ATM 10. Return to step 110.

Figure 9:
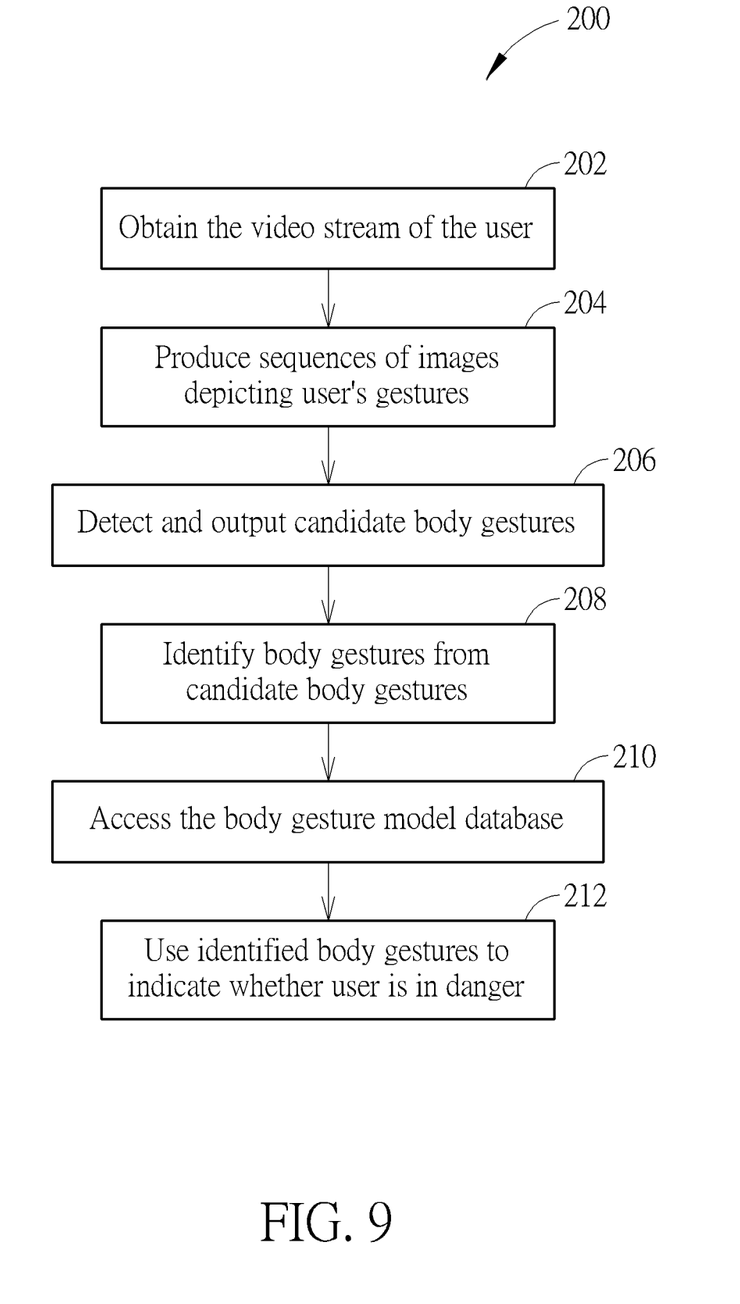
FIG. 9 is a flowchart describing in greater detail the steps contained within step 200 of the flowchart of FIG. 8.

Step 200: Perform body gesture detection on the user of the ATM 10. The monitoring device 22 performs a series of detection steps that are included in step 200, and these steps are shown in the flowchart of FIG. 9. In short, the monitoring device 22 analyzes the video stream and compares image sequences from the video stream with images stored in the body gesture model database 32 to produce a new gesture comparison result. Go to step 300.

Step 300: Determine if the user of the ATM 10 is in danger. According to the new gesture comparison result produced in step 200, the monitoring device 22 determines if the user of the ATM 10 appears to be in danger or is exhibiting suspicious behavior. If so, go to step 302. If not, go to step 304.

Step 302: Abnormal output is detected since the monitoring device 22 determines that the user of the ATM 10 is in danger or is exhibiting suspicious behavior. The authorities 40 can be alerted at this time, a warning can be issued through the user interface 16 of the ATM 10, and the process ends.

Step 304: Obtain facial data of the user of the ATM 10. The facial data is obtained through images taken from the video stream produced by the camera 20. Go to step 400.

Figure 10:
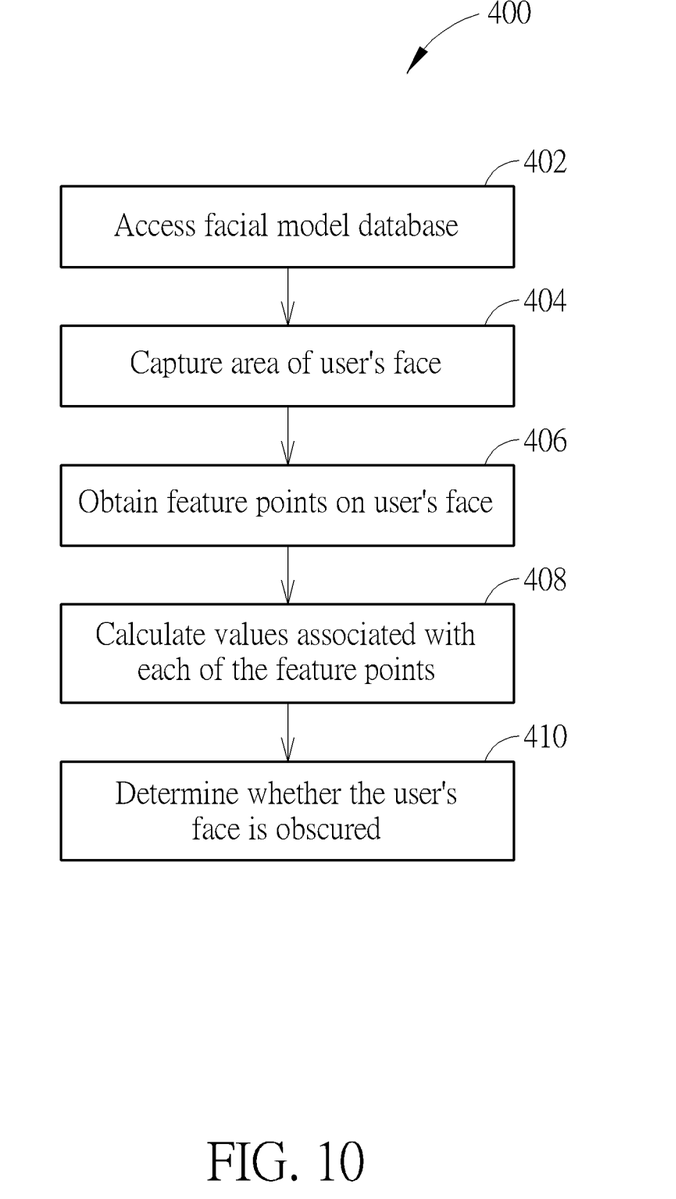
FIG. 10 is a flowchart describing in greater detail the steps contained within step 400 of the flowchart of FIG. 8.

Step 400: Determine if the user's face is obscured. If there is anything blocking the user's face, the user's face is obscured, and a clear image of the users face cannot be obtained. The monitoring device 22 performs a series of determination steps that are included in step 400, and these steps are shown in the flowchart of FIG. 10. In short, the monitoring device 22 analyzes the video stream and compares images from the video stream with images stored in the facial model database 30 to produce a corresponding face comparison result. When the user's face is obscured, go to step 500. Otherwise, go to step 502.

Step 500: Issue a reminder to the user to uncover his face by removing whatever article is blocking the user's face. Return to step 304.

Step 502: Since the user's face is unobscured, the user is permitted to normally perform his financial transaction on the ATM 10. That is, the user is not stopped from using the ATM 10 since there are no abnormal body gestures detected and the user's face is unobscured. The process ends.

Please refer to FIG. 9. FIG. 9 is a flowchart 200 describing in greater detail the steps contained within step 200 of the flowchart of FIG. 8. Steps in the flowchart 200 will be explained as follows.

Step 202: Obtain the video stream of the user that is created using the camera 20.

Step 204: Produce one or more sequences of images from the video stream that depict one or more gestures made by the user of the ATM 10.

Step 206: Use a deep neural network (DNN) to detect and output candidate body gestures from the one or more sequences of images from the video stream depicting gestures.

Step 208: Perform a Hough transform to identify body gestures from the candidate body gestures.

Step 210: Access the body gesture model database 32 with the monitoring device 22.

Step 212: Compare the identified body gestures with images stored in the body gesture model database 32 to produce a new gesture comparison result indicating whether the user of the ATM 10 is in danger or is exhibiting suspicious behavior.

Please refer to FIG. 10. FIG. 10 is a flowchart 400 describing in greater detail the steps contained within step 400 of the flowchart of FIG. 8. Steps in the flowchart 400 will be explained as follows.

Step 402: Access the facial model database 30 that was built using Adaptive Boosting (AdaBoost). The facial model database 30 is trained with image samples containing faces that are both obscured and unobscured so that the facial model database 30 provides adequate information the monitoring device 22 to make a judgment on whether the user's face is obscured or unobscured.

Step 404: Capture the area of the user's face based on the obtained video stream of the user.

Step 406: Obtain feature points on the user's face. The feature points are those points on the face that are most useful in identifying a person's face, and the feature points represent the different characteristics of the user's face, such as the corners and outer edges of the eyes, corners and outer edges of the mouth, corners and outer edges of the nose, outer edges of the eyebrows, and outer edges of the face.

Step 408: Calculate values associated with each of the feature points of the user's face. These values can be calculated with the assistance of a machine learning method such as "Random Forest". The calculated values of the feature points can be converted into feature vectors. Then support vector machine (SVM) training can be performed to build a feature model based on the feature vectors. This feature model can be used to indicate whether the user's face is blocked or not.

Step 410: A determination is made whether the user's face is obscured or not, and which part of the user's face is obscured. The result is then output to indicate if there is anything blocking the user's face.

In summary, the present invention provides a way to increase security involving ATM transactions. The present invention is able to monitor the ATM camera's video stream in order to automatically detect situations in which the user's face is obscured, when a person in the background behind the user has his face obscured, when the user is acting suspiciously, or when a person in the background is acting suspiciously. In this way, fraudulent use of the ATM and robbery of users of the ATM can be minimized. Not only can the present invention prevent crime, but it can also make users more willing to use the ATM by making the users feel safe while using the ATM.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of preventing fraud and theft during automated teller machine (ATM) transactions, the method comprising:
   recording a video stream using a camera mounted on or near the ATM, the camera being positioned to record the face of a user of the ATM and a background behind the user;
   providing a facial model database containing images of a large number of people taken from different angles, the facial model database containing images of unobscured faces as well as obscured faces;
   receiving insertion of a bank card into the ATM;
   comparing images captured from the recorded video stream with images contained in the facial model database, and producing a corresponding first face comparison result;
   issuing a notice for the user to uncover the user's face when the first face comparison result indicates that the user's face is obscured;
   analyzing the recorded video stream to monitor a background behind the user;
   detecting at least one unidentified person in the background;
   recording the face of the at least one unidentified person;
   comparing images of the at least one unidentified person with images contained in the facial model database, and producing a corresponding second face comparison result and
   issuing a warning when the second face comparison result indicates that the at least one unidentified person's face is obscured.

2. The method of claim 1, further comprising preventing the user from withdrawing or transferring money through the ATM when the first face comparison result indicates that the user's face is still obscured after issuing the notice for the user to uncover the user's face.

3. The method of claim 1, further comprising recording images of the user's face and associating the recorded images with an account corresponding to the bank card inserted into the ATM.

4. The method of claim 3, further comprising:
   comparing recorded images of the user's face with other facial images previously recorded and associated with the account corresponding to the bank card inserted into the ATM; and
   alerting authorities when the recorded images of the user's face do not match the other facial images previously recorded and associated with the account corresponding to the bank card inserted into the ATM.

5. The method of claim 3, further comprising:
   comparing recorded images of the user's face with facial images previously recorded of people included on a watch list; and
   alerting authorities when the recorded images of the user's face match facial images of one or more people included on the watch list.

6. The method of claim 1, further comprising providing a body gesture model database containing images of a large number of different body gestures, with some of the body gestures in the body gesture model database indicating a first type of behavior and other body gestures in the body gesture model database indicating a second type of behavior.

7. The method of claim 6, further comprising:
   comparing images of the user with images contained in the body gesture model database, and producing a corresponding gesture comparison result; and
   alerting authorities when the gesture comparison result indicates that the user is exhibiting the second type of behavior.

8. The method of claim 1, further comprising issuing a notice for the at least one unidentified person to keep a safe distance from the user upon detecting the at least one unidentified person.

9. The method of claim 1, further comprising:
   comparing images of the at least one unidentified person with images contained in the body gesture model database, and producing a corresponding gesture comparison result; and
   alerting authorities when the gesture comparison result indicates that the at least one unidentified person is exhibiting the second type of behavior.

10. The method of claim 1, further comprising alerting authorities when the second face comparison result indicates that the at least one unidentified person's face is obscured.

11. The method of claim 1, further comprising:
    analyzing the recorded video stream to monitor the ATM and a surrounding area of the ATM; and
    alerting authorities when detecting that the ATM or the surrounding area of the ATM have been damaged.

12. The method of claim 1, further comprising:
    analyzing the recorded video stream to determine if the camera is being blocked; and
    preventing the user from withdrawing or transferring money through the ATM when determining that the camera is being blocked.

13. A system of preventing fraud and theft during automated teller machine (ATM) transactions, the system comprising:
    an ATM, the ATM comprising:
      a first processor for controlling operation of the ATM;
      a card slot for receiving insertion of a bank card into the card slot; and
      a user interface;
    a camera mounted on or near the ATM, the camera recording a video stream and being positioned to record the face of a user of the ATM and a background behind the user;
    a facial model database containing images of a large number of people taken from different angles, the facial model database containing images of unobscured faces as well as obscured faces;
    a monitoring device comprising a second processor, the monitoring device comparing images captured from the recorded video stream with images contained in the facial model database, and producing a corresponding first face comparison result wherein the user interface of the ATM issues a notice for the user to uncover the user's face when the first face comparison result indicates that the user's face is obscured;
    analyzing the recorded video stream to monitor a background behind the user;
    detecting at least one unidentified person in the background;

recording the face of the at least one unidentified person;

comparing images of the at least one unidentified person with images contained in the facial model database, and producing a corresponding second face comparison result; and issuing a warning when the second face comparison result indicates that the at least one unidentified person's face is obscured.

14. The system of claim 13, wherein the user interface prevents the user from withdrawing or transferring money through the ATM when the first face comparison result indicates that the user's face is still obscured after issuing the notice for the user to uncover the user's face.

15. The system of claim 13, further comprising:

a user face database containing facial images previously recorded and associated with the account corresponding to the bank card inserted into the ATM;

wherein the monitoring device compares recorded images of the user's face with other facial images stored in the user face database associated with the account corresponding to the bank card inserted into the ATM, and alerts authorities when the recorded images of the user's face do not match the other facial images stored in the user face database associated with the account corresponding to the bank card inserted into the ATM.

16. The system of claim 13, further comprising:

a body gesture model database containing images of a large number of different body gestures, with some of the body gestures in the body gesture model database indicating a first type of behavior and other body gestures in the body gesture model database indicating a second type of behavior;

wherein the monitoring device compares the images captured from the recorded video stream with images contained in the body gesture model database, produces a corresponding gesture comparison result, and alerts authorities when the gesture comparison result indicates that the user or that at least one unidentified person in a background behind the user is exhibiting the second type of behavior.

17. The system of claim 13, further comprising:

a watch list database comprising names and associated facial images of people included on a watch list;

wherein the monitoring device compares recorded images of the user's face with facial images contained in the watch list database, and alerts authorities when the recorded images of the user's face match facial images of one or more people included on the watch list.

* * * * *